US008780945B2

United States Patent
Gips et al.

(10) Patent No.: US 8,780,945 B2
(45) Date of Patent: Jul. 15, 2014

(54) DISCOVERY PROTOCOL

(75) Inventors: Jonathan Gips, Boston, MA (US);
Ryan Aylward, Boston, MA (US);
Mathew Laibowitz, Cambridge, MA (US)

(73) Assignee: SNIF Labs, Inc, Cambridge, MA (US)

( * ) Notice: Subject to any disclaimer, the term of this patent is extended or adjusted under 35 U.S.C. 154(b) by 703 days.

(21) Appl. No.: 12/553,921

(22) Filed: Sep. 3, 2009

(65) Prior Publication Data
US 2010/0054138 A1    Mar. 4, 2010

Related U.S. Application Data

(60) Provisional application No. 61/093,909, filed on Sep. 3, 2008.

(51) Int. Cl.
H04J 3/06 (2006.01)
H04J 3/16 (2006.01)

(52) U.S. Cl.
USPC ........ 370/508; 370/248; 370/346; 340/573.3; 340/539.13

(58) Field of Classification Search
USPC .................. 370/467, 248, 345, 346, 508;
340/573.3, 572.1, 425.5, 438, 439,
340/539.1, 539.13, 540, 545.6, 585
See application file for complete search history.

(56) References Cited

U.S. PATENT DOCUMENTS

| 7,028,547 | B2 | 4/2006 | Shiratori et al. | |
|---|---|---|---|---|
| 7,039,391 | B2 * | 5/2006 | Rezvani et al. | 455/411 |
| 2004/0039504 | A1 * | 2/2004 | Coffee et al. | 701/35 |
| 2005/0131736 | A1 * | 6/2005 | Nelson et al. | 705/2 |
| 2006/0116744 | A1 | 6/2006 | Von Arx et al. | |
| 2006/0128349 | A1 * | 6/2006 | Yoon | 455/343.2 |
| 2007/0103296 | A1 * | 5/2007 | Paessel et al. | 340/539.22 |
| 2007/0208542 | A1 | 9/2007 | Vock et al. | |
| 2008/0181170 | A1 | 7/2008 | Branlund et al. | |
| 2009/0048498 | A1 * | 2/2009 | Riskey | 600/302 |
| 2010/0054138 | A1 * | 3/2010 | Gips et al. | 370/248 |

OTHER PUBLICATIONS

International Search report with Written Opinion, dated Oct. 28, 2009, received in international patent application No. PCT/US09/055937, 11 pgs.
International Search report with Written Opinion, dated Oct. 30, 2009, received in international patent application No. PCT/US09/055938, 12 pgs.
International Preliminary Report on Patentability with Written Opinion, mailed Mar. 17, 2011, received in international patent application No. PCT/US09/055937, 7 pgs.
International Preliminary Report on Patentability with Written Opinion, mailed Mar. 17, 2011, received in international patent application No. PCT/US09/055938, 8 pgs.

\* cited by examiner

Primary Examiner — Benjamin H Elliott, IV
(74) Attorney, Agent, or Firm — Schwegman, Lundberg & Woessner, P.A.

(57) ABSTRACT

A method and device may comprise transmitting, via a transmitter, a plurality of transmit pings at a transmit interval. A receiver may listen, for a live ping and the receiver may be configured to be turned on at a beginning of the assess interval, and off at an end of the detect duration. The receiver may further receive the live ping. After receiving the live ping, transmission of a new ping may be delayed for a delay duration. The new pings may be transmitted at the transmit interval.

20 Claims, 7 Drawing Sheets

| Activity State | Locomotive Rate (locomotive rate, m/s, approximated) | Device Range (m / ping period unit) | Minimum Period (s) | Maximum Period (s) | Ping Period (s / ping period unit) |
|---|---|---|---|---|---|
| Inactive ($S_I$) | $L_I = .0001$ | $R = 10$ | $C_1 = B*M = 0.4$ | $C_2 = 300$ | 300 |
| Low Activity ($S_L$) | $L_L = .5$ | | | | 20.0 |
| Walking ($S_W$) | $L_W = 1$ | | | | 10.0 |
| Jogging ($S_J$) | $L_J = 1.5$ | | | | 6.67 |
| Running ($S_R$) | $L_R = 2.5$ | | | | 4 |

DISCOVERY PROTOCOL

RELATED APPLICATIONS

This application claims the benefit of U.S. Provisional Patent Application No. 61/093,909 filed on 3 Sep. 2008, the entire contents of which are herein incorporated by reference.

BACKGROUND OF THE INVENTION

This disclosure relates to a discovery protocol and, more particularly, to a system and method for discovering devices.

Some devices, such as wireless sensors including active radio frequency identification (RFID) tags may be capable of discovering other devices. To receive signals and, in turn, discover devices which may have sent those signals, the devices may need to have a receiver that may be powered on and off. Further, in order to be discovered by other devices, these same devices may need to transmit one or more signals.

Additionally, while transmitting and receiving signals, these devices may require additional power. The device's receiver may be continuously powered on for a relatively long time before a signal is received, and in turn, before another device is discovered. Further, the device may transmit many signals before another device receives one of those signals, and, in turn, discovers that device.

BRIEF SUMMARY OF THE INVENTION

In a first implementation, a method may comprise transmitting, via a transmitter, a plurality of transmit pings at a transmit interval, the transmit interval corresponding to a time between transmission of each transmit ping. The method may further comprise listening, via a receiver, for a live ping, the receiver configured to be turned on at a beginning of an assess interval, and off at an end of a detect duration. The assess interval may correspond to a time each packet in the live ping is spaced apart multiplied by an amount of packets in the live ping. Further, the detect duration may correspond to the time each packet in the live ping is spaced apart plus a transmit time. Furthermore, the transmit time may correspond to a time required for a packet to travel from one device to another. The method may further comprise receiving, via the receiver, at least one packet from the live ping. Additionally, the method may comprise delaying, after receiving the live ping, transmission of a new ping for a delay duration. The delay duration may correspond to an amount of time determined, at least in part, by a counter value of a packet of the live ping. The method may further comprise transmitting, via the transmitter, the new ping at the transmit interval.

One or more of the following features may be included. At least one of the transmit ping, the live ping, and the new ping may comprise a plurality of packets, each transmitted at a burst interval. The burst interval may correspond to a time each packet in the plurality of packets is spaced apart. Further, at least one packet of the plurality of packets may be received in the transmit time. Moreover, the transmit time may be less than one burst interval. Furthermore, the detect duration may correspond to the transmit time plus one burst interval. Also, each packet may comprise at least one of a device identifier, status information, and a counter value.

In some embodiments, the transmit interval may be between about 3 seconds and about 12 seconds. Further, the burst interval may be between about 1 millisecond and about 2 milliseconds. Moreover, at least one of the transmit ping, the live ping, and the new ping may comprise between about 96 packets and about 320 packets. Additionally, the packets may be RF packets. The method may further comprise delaying, after receiving the live ping, transmission of a new ping for an additional backoff duration. The backoff duration may correspond to an amount of time configured to prevent pings from colliding.

In a second implementation, a method may comprise transmitting, via a transmitter, a plurality of transmit pings at a transmit interval. The transmit interval may correspond to a time between transmission of each transmit ping. Each transmit ping may include a number of packets. The method may further comprise listening, via a receiver, for a live ping, each live ping including a number of packets. The receiver may be configured to be turned on at a beginning of an assess interval, and off at an end of a detect duration. The assess interval may correspond to a time each packet in the live ping is spaced apart multiplied by an amount of packets in the live ping. The detect duration may correspond to the time each packet in the live ping is spaced apart plus a transmit time. The transmit time may correspond to a time required for a packet to travel from one device to another. The method may further comprise receiving, via the receiver, at least one packet of the live ping. Additionally, the method may comprise delaying, after receiving the live ping, transmission of a new ping for a delay duration plus a backoff duration. The delay duration may correspond to an amount of time determined, at least in part, by a counter value of the received packet of the live ping. The counter value may designate which packet in the live ping was received by the receiver. The backoff duration may correspond to an amount of time configured to prevent pings from colliding. The method may further comprise transmitting, via the transmitter, the new ping at the transmit interval. The new ping may include a plurality of packets.

One or more of the following features may be included. The assess interval may be B*M. B may correspond to the time each packet in the live ping is spaced apart. M may correspond to the number of packets in the live ping. Further, the detect duration may be B+P. P may correspond to the amount of time each packet of the live ping is in transmission. Moreover, the backoff duration may be configured to prevent pings from colliding for up to N/(B*M) devices. N may correspond to the transmit interval. The transmit interval may correspond to a time between transmission of each ping. Furthermore, the method may comprise duty cycling the receiver based upon, at least in part, the assess interval. Additionally, the method may comprise duty cycling the receiver based upon, at least in part, the detect duration.

In a third implementation, a method may comprise transmitting, via a transmitter, a plurality of transmit pings at a transmit interval. The transmit interval may correspond to a time between transmission of each transmit ping. Each transmit ping may include a number of packets. The method may further comprise listening, via a receiver, for a live ping. Additionally, the method may comprise receiving, via the receiver, at least one packet of the live ping. The method may further comprise delaying, after receiving the live ping, transmission of a new ping for a delay duration. The delay duration may correspond to an amount of time determined, at least in part, by a counter value of a packet of the live ping. Also, the method may comprise transmitting, via the transmitter, the new ping at the transmit interval. The new ping may include a plurality of packets.

One or more of the following features may be included. A monitoring device having the transmitter may be in communication with a remote device having a second receiver, without network synchronization. The method may further comprise duty cycling the receiver.

In a fourth implementation, a device may comprise a transmitter. The transmitter may be configured to transmit a plurality of transmit pings at a transmit interval. The transmit interval may correspond to a time between transmission of each transmit ping. Each transmit ping may include a number of packets. The device may also comprise a receiver. The receiver may be configured to listen for a live ping and to receive at least one packet of the live ping. The transmitter may be further configured to delay transmission of a new ping for a delay duration, and to transmit a new ping at the transmit interval. The delay duration may correspond to an amount of time determined, at least in part, by a counter value of the at least one packet of the live ping.

BRIEF DESCRIPTION OF THE SEVERAL VIEWS OF THE DRAWINGS

FIG. 7 is a table showing parameters used by the monitoring device.

DETAILED DESCRIPTION OF THE INVENTION

Figure 1:
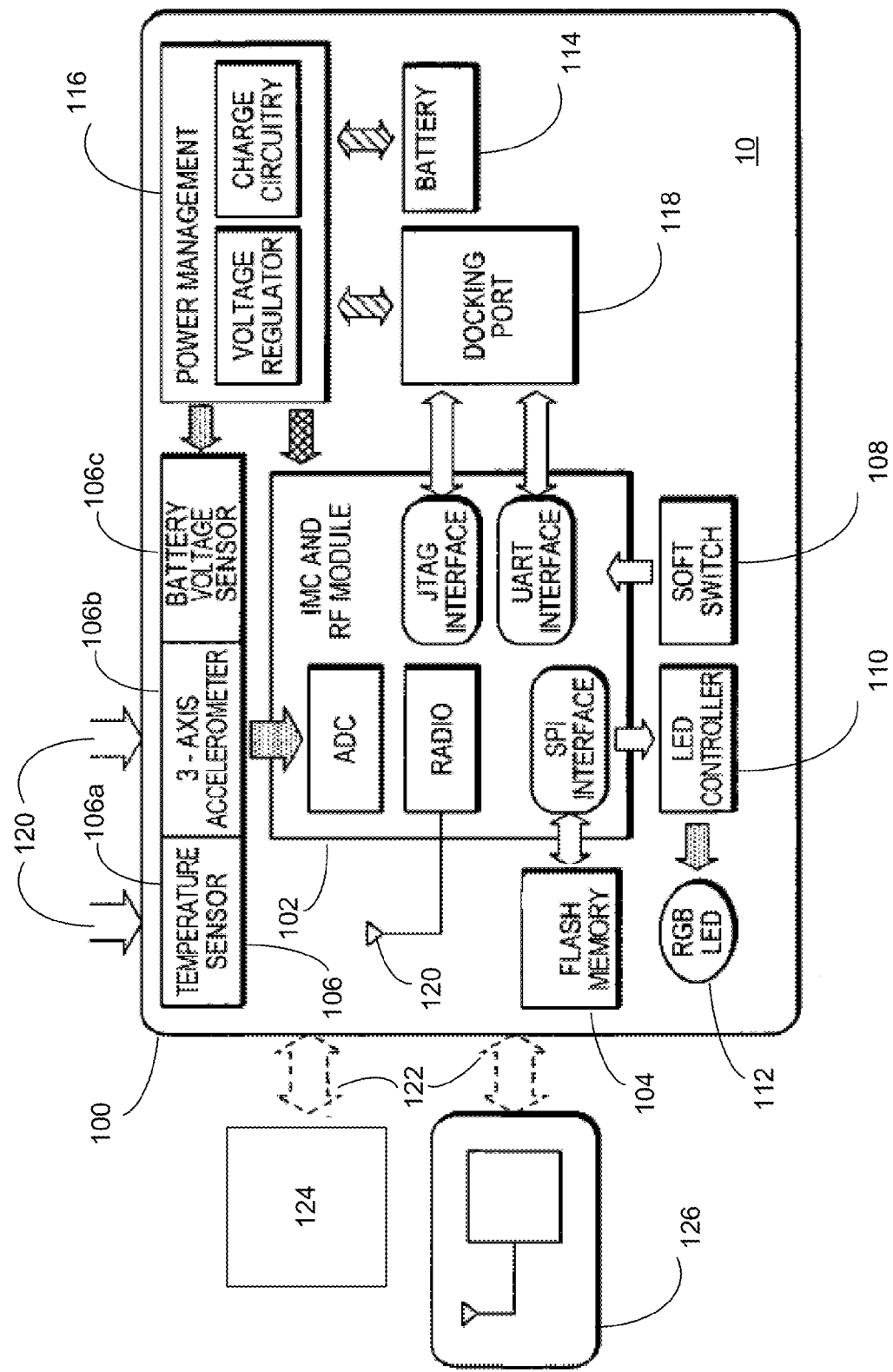
FIG. 1 is a diagrammatic view of a monitoring system.
Figure 2:
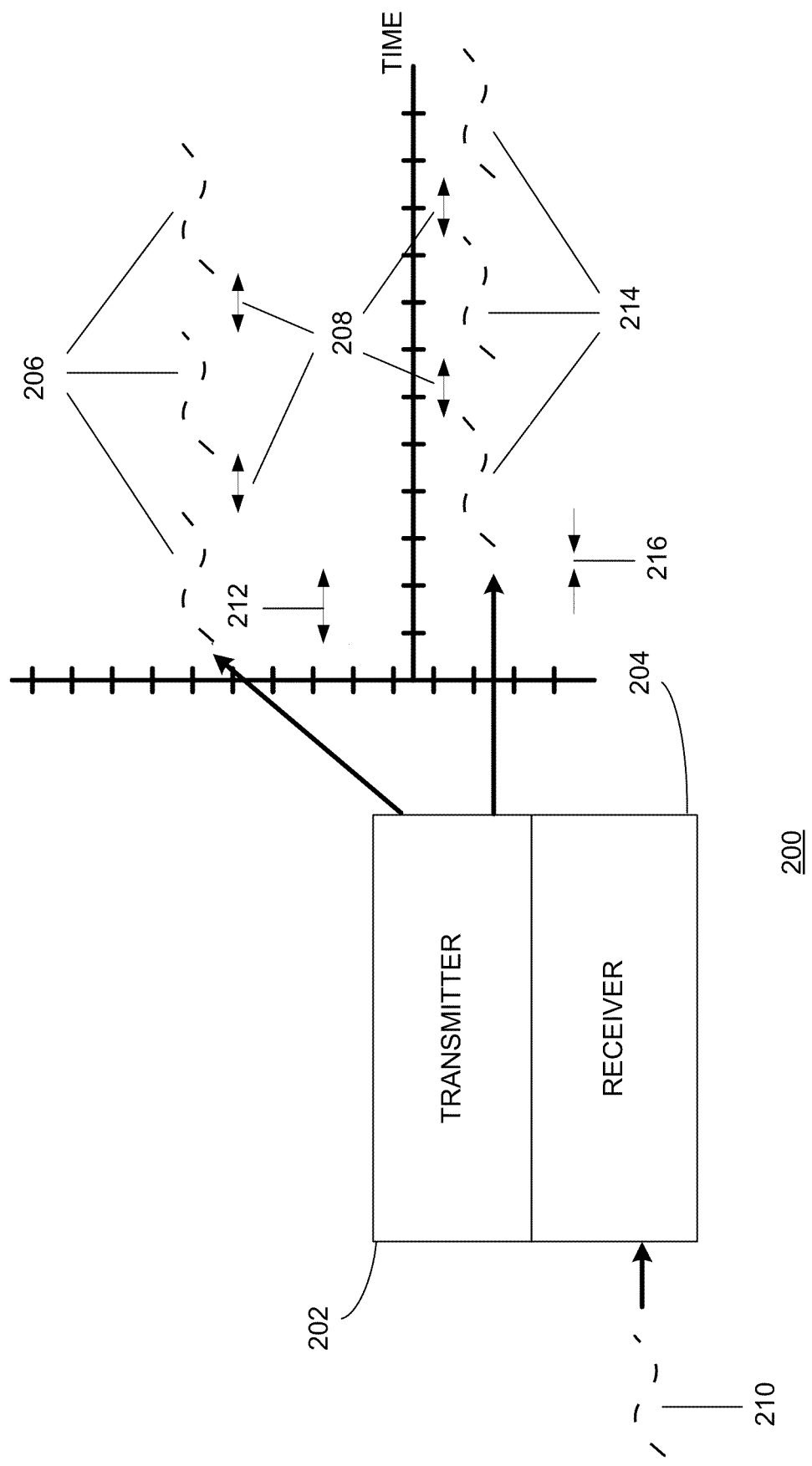
FIG. 2 is a diagrammatic view of a transmitter and receiver.

Referring to FIGS. 1 and 2, there is shown a monitoring system 10. Monitoring system 10 is merely an example of a system and/or device which may be configured to operate in accordance with the discovery protocol of the subject application. Monitoring system 10 may include RF module 102. Monitoring system 10 may be a monitoring device or electronic tag which may be attached to an object or worn by a person or animal. In one embodiment, as shown in FIG. 2, an RF module (e.g., RF module 200) may include transmitter 202 and receiver 204. Monitoring system 10 may comprise several components housed in an enclosure 100. Enclosure 100 may be of a compact form that may be attached to an object. For example, enclosure 100 may be worn by an animal such as a dog. The enclosure 100 may be fixed to a collar or other device. In such a case, enclosure 100 may take the form of a conventional tag, such as a dog tag, or an ID tag worn by an employee at a workplace, such as a hospital. Monitoring system 10 may include an integrated microcontroller (IMC) and radio frequency (RF) module 102, flash memory storage 104, a plurality of sensors 106, soft switch 108, light emitting diode (LED) controller 110 which may control an LED 112, battery 114, power management circuitry 116 and docking port 118.

Additionally, plurality of sensors 106 may include temperature sensor 106a and accelerometer 106b, which may measure environmental conditions relative to monitoring device 10. One or more of plurality of sensors 106 may measure one or more characteristics of an object that monitoring device 10 may be attached to. For example, temperature sensor 106a may receive environmental input 120, and may be adapted to detect the ambient air temperature of the environment or the temperature of a nearby surface, such as the surface of the object attached to monitoring system 10. Again by example, accelerometer 106b may be a 3-axis accelerometer which may detect acceleration, deceleration and other movements of the monitoring system 10 and/or the object it may be attached to. Accelerometer 106b may utilize three analog outputs to provide measurements in real time to IMC module 102. Alternatively, other sensors may be substituted for or added to plurality of sensors 106, thereby providing other measurements relating to the environment or the object. For example, alternative sensors may measure ambient light, humidity, altitude, or heart rate of the object (e.g., a person, animal, etc.).

IMC module 102 may perform a number of functions as determined by the mode of operation of monitoring device 10. IMC 102 may receive analog signals from plurality of sensors 106, and may convert the signals to digital signals with an analog-to-digital converter (ADC). Further, IMC 102 may capture and process the signals according to one or more software or firmware programs stored at IMC 102 or flash memory 104. The signals may be processed at IMC 102, for example, by sampling the signals at variable intervals, deriving a conditioned selection of signals, detecting an event based on the signals, or producing data relating to a set of signals. The processed event data may be stored to flash memory 104 through a serial peripheral interface (SPI). The event data may also be sent to the radio (RF) module (at IMC 102) with antenna 120, where it may be transmitted via wireless communication 122 to base station 124 or remote device 126. Base station 124 may be a stand alone base station, a computer, or both. In some embodiments base station 124 may be in communication with a computer which may allow the base station to be bridged to a network. Remote device 126 may be similar system and/or device to monitoring system 10, and may include any of the features of monitoring system 10. The RF module at IMC 102 may also receive wireless signals from base station 124 or remote device 126, enabling data transfer or other communication.

For example, one mode of operation of monitoring device 10 may be discovery mode and/or ping mode. While in discovery mode and/or ping mode, monitoring device 10 may be configured to operate in accordance with the discovery protocol of the subject application.

In some embodiments, base station 124 may connect to a computer via a universal serial bus (USB) connection or similar connection. The base station may be USB or wall powered and may be capable of communicating to the tag (e.g., monitoring system 10). The base station may typically reside in a user's home, or any other suitable location. The base station may also serve as a charging dock for the tag (e.g., monitoring system 10). In other embodiments, base station 124 may be a network connected base station, i.e., an integrated transceiver and network (e.g., Ethernet) module. The transceiver may include a transmitter and receiver such as those described herein.

IMC 102 may be programmed to detect a particular reading or signal ("event"), which may be received from one or more of the plurality of sensors 106 or communication with base station 124 or remote device 126. In response to the event, IMC 102 may send a signal to LED controller 110, which may indicate to activate one or more LED lights 112. LED lights 112 may turn on or enter a blinking pattern to indicate the occurrence of the event. For example, One or more LED lights 112 may flash to indicate that battery 114 is low on power, the ambient temperature has reached a threshold, or another remote device 126 is nearby.

Further, soft switch 108 may connect to IMC 102 and may be configured to toggle modes of operation of monitoring system 10, such as power on, power off and low power operation. IMC 102 may also interface with docking port 118, which may be connected to a port of a base station. Through this link, IMC 120 may transfer data stored at flash memory 104, as well as information about monitoring device 10 such as hardware and software settings, storage capacity, and firmware version. IMC 102 may also receive commands and data from the base station, such as a command to update firmware of IMC 102, accompanied by updated firmware.

In one embodiment, monitoring device 10 may be a tag worn by a pet animal such as a dog. The pet animal may be the object and/or agent monitored by monitoring device 10. One or more of the plurality of sensors 106 may detect or measure the temperature and/or acceleration, for example, of the pet animal, and a radio receiver at IMC 120 and/or the RF module may receive signals from a second tag (e.g., a tag including remote device 126). The second tag may be worn by a second pet animal. This data may be processed by IMC 102 to produce event data. The event data may relate to the environment and the behavior of the pet animal, such as its activities (e.g., whether it is walking, running or at rest) and its interaction with other animals as evidenced by signals received by the second tag (e.g., remote device 126). The event data may be transferred to base station 124 in real time, or may be stored to flash memory 104 for transfer at a later time. Base station 124 may communicate with monitoring device 10 by receiving the event data and sending commands and other signals to monitoring device 10. Further base station 124 may report the event data or transfer the data to a server on a computer network. A pet owner may access base station 124 or the network in order to monitor the behavior of his or her pet animal.

In another embodiment, monitoring device 10 may be a tag, badge, strip, insert, etc. (e.g., an ID tag) worn by a human (e.g., a worker in a building or a nurse in a hospital). For example, if monitoring device 10 is an ID tag worn by a nurse in a hospital, monitoring device 10 may be in communication with a base station located in the hospital. Monitoring device 10 may relay information describing the nurse's movement in around the hospital to the base station. Further, monitoring device 10 may be in communication with other devices in the hospital (e.g., remote device 126), and may discover such devices in accordance with the discovery protocol of the subject application. Monitoring device 10 may provide various alerts based upon, at least in part, the nurse's movement around the hospital or in relation to the other devices.

Various client electronic devices may be directly or indirectly coupled to the network. For example, personal computers may be directly coupled to the network via a hardwired network connection. Notebook computers may be directly coupled to the network via a hardwired network connection. Laptop computers may be wirelessly coupled to the network via a wireless communication channel established between the laptop computer and a wireless access point (i.e., WAP), which may be directly coupled to the network. The WAP may be, for example, an IEEE 802.11a, 802.11b, 802.11g, WiFi, and/or Bluetooth device that is capable of establishing wireless communication channel between a laptop computer and the WAP. A personal digital assistant may be wirelessly coupled the network via wireless communication channel established between the personal digital assistant and a cellular network/bridge, which may be directly coupled the network.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Discovery Protocol

Figure 3:
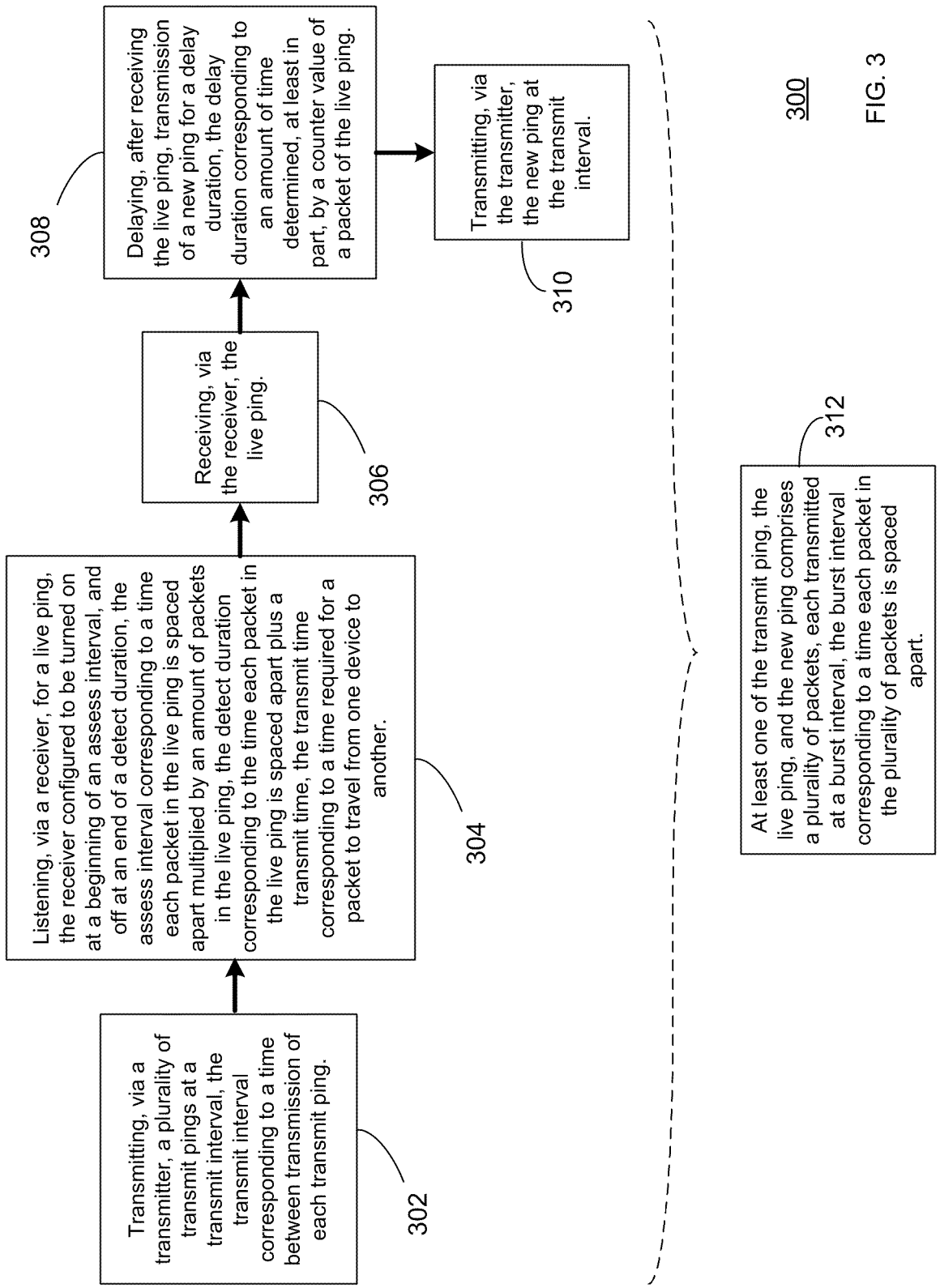
FIG. 3 is a flowchart of a discovery process implemented by the monitoring system of FIG. 1.
Figure 4:
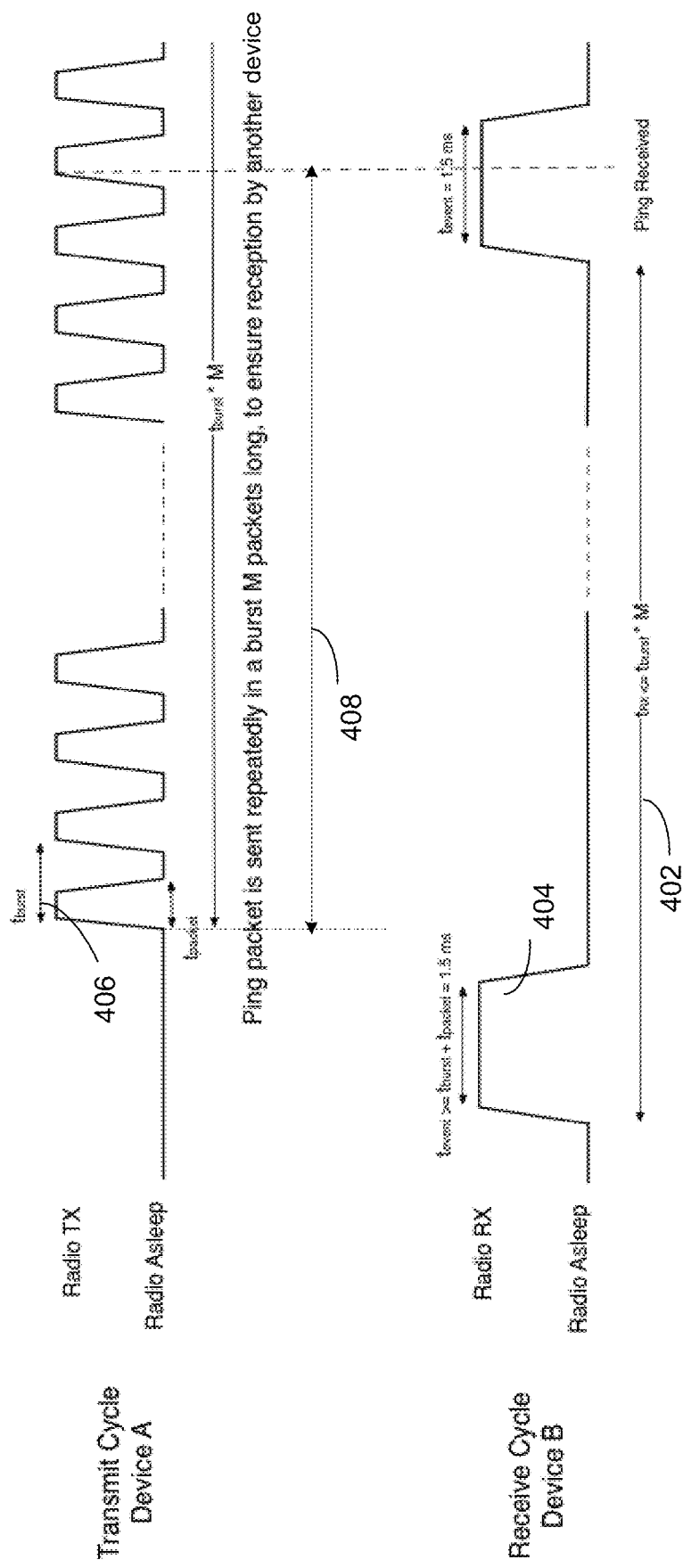
FIG. 4 is a timing diagram of signals transmitted and received by the monitoring system of FIG. 1.

As discussed above monitoring device 10 may include INC 102, which may include an RF module. In other embodiments, the RF module may be separate from IMC 102. Referring now to FIGS. 2-4, RF module 200 may include a transmitter 202 and a receiver 204, both of which may be included in monitoring device 10. Transmitter 202 and receiver 204 may also be separate devices. As shown in FIG. 3, transmitter 202 and receiver 204 may, either alone or in conjunction with other devices described above, perform discovery process 300 in accordance with a discovery protocol described herein. For illustrative purposes, transmitter 202 and receiver 204 are discussed throughout this disclosure as being configured to transmit and receive RF signals, however they may operate with any other type of communication signal. For example transmitter 202 and receiver 204 may transmit and receive infrared signals, visible light signals, acoustic signals, or data modulated in other mediums.

For illustrative purposes only, transmitter 202 and receiver 204 will be discussed throughout this disclosure as being associated with monitoring device 10. When transmitting and receiving RF signals, monitoring device 10 may be in RF mode. In RF mode, transmitter 202 and receiver 204 may be configured to transmit and receive RF signals. However monitoring device 10 may switch to other modes in order to communicate (i.e., transmit and receive) using Bluetooth, Zigbee, WiFi (802.11), and/or infrared (IR) signals.

Transmitter 202 may transmit 302 a plurality of transmit pings 206 at transmit interval 208. Transmit interval 208 may correspond to the time (e.g., N seconds) between the transmission of each ping. In some embodiments, N may be between 3 and 12 seconds, or any other number which may be used in each particular monitoring system. Each transmit ping may be a burst (e.g., a number M) of short RF packets. In some embodiments, M may be between 96 and 320, or any other number which may be used in each particular monitoring system. Calibration of different monitoring systems using different signal types, etc., may yield other optimal values for N and M. Each packet (e.g., an RF packet) may include, inter alia, a device identifier, status information, and/or a counter value. Different counter values may correspond to different positions of packets in each burst. Further, each RF packet may be spaced apart at a burst interval (e.g., B milliseconds). In other words, each RF packet in each transmit ping may be B milliseconds apart.

Receiver 204 may listen 304 for a live ping (e.g., live ping 210). Live ping 210 may have been transmitted by a different transmitter associated with a different monitoring device (e.g., remote device 126), for the purposes of detection and/or discovery. For the purposes of this disclosure, listening means that the receiver (e.g., receiver 204) is "on", receiving, or otherwise able to detect signals. Referring now to FIGS. 2 and 4, receiver 204 may be configured to be turned on at a beginning of assess interval 402, and off at an end of detect duration 404. When "off", the receiver may be asleep, or otherwise using substantially less power than when "on". As shown in FIG. 4, assess interval 402 may correspond to an amount of time each packet in a ping (e.g., live ping 210) is spaced apart (e.g., B), multiplied an amount of packets (e.g., M) in live ping 210 (e.g., B*M). The plurality of packets in a ping (e.g. live ping 210) may be referred to herein as a burst.

Further, detect duration 404 may correspond to the amount of time each packet in a ping (e.g., live ping 210) is spaced apart (e.g., B) plus an amount of time each packet is in the air.

B may also be referred to herein as a "burst interval". Each packet may be on the air and in progress for a transmit time (e.g., P milliseconds). The transmit time may correspond to a time required for a packet to travel from one device to another. Accordingly, detect duration 404 may be B+P=R milliseconds long. In other words, at least one packet in a transmit ping may be received in R milliseconds. B, M, and P may be calculated and calibrated such that as long as each packet in a ping (e.g., live ping 210) has a transmit time (e.g., transmit time 408 of P milliseconds or less), another device (e.g., remote device 126) will receive the at least one packet of the ping. In some embodiments, transmit time may also include the time required for a packet to be received in its entirety, including processing time at the receiving device. In some situations, a portion of a packet may be received and may be rejected, however an entire packet may still be received in the transmit time. It follows that in some embodiments, transmit time P must be less than the amount of time B (e.g., one burst interval) that each packet in a ping (e.g., live ping 210) is spaced apart.

As discussed above, receiver 204 may be configured to be turned on at the beginning of assess interval 402, and off at an end of detect duration 404. This process, wherein receiver 204 is powered on/off, or is otherwise inactive for a period of time, may be referred to herein as "duty cycling" the receiver. A "duty cycle" may be a percentage of time that the receiver is in an "on" state. For example, if the receiver (e.g., receiver 204) is "on" (i.e., active, or listening) for 25 seconds, and "off" for 75 seconds, its duty cycle may be 25/100, or 25%. Monitoring device 10 may be configured such that receiver 204 is duty cycled to minimize its power usage, while maximizing its discoverability when in discovery or ping mode. Accordingly, receiver 204 may be duty cycled based upon, at least in part, either the assess interval, the detect duration, or both. In some embodiments, the receiver may be duty cycled based upon, at least in part, information in at least one packet of the live ping.

Further, receiver 204 may receive 306 live ping 210. Receiving live ping 210 may include receiving one or more packets of the total number of packets (e.g., M) in live ping 210. As discussed above, live ping 210 may have been sent by another monitoring device, (e.g., remote device 210). For illustrative purposes, assume that each system/device (e.g., monitoring system 10 and/or remote device 126) listens for R milliseconds (e.g., detect duration 404 of B+P milliseconds) to detect any pings which may be in progress (e.g., live ping 210). Further, assume each packet of a ping (e.g., live ping 210) may include a device identifier, status information, and a counter value. The counter value may correspond to different positions of packets in each burst. If one of the devices receives a packet (e.g., from live ping 210), it can use a counter value of the packet to determine delay duration 212. In other words the device (e.g., monitoring system 10) may calculate (via, e.g., IMC 102) delay duration 212 in order to delay transmitting a new ping (e.g., new pings 214).

Accordingly, transmitter 202 may delay 308, after live ping 210 is received, transmission of a new ping (e.g., new pings 214) for delay duration 212. Once a new ping has been delayed in time, the transmitter may transmit 310 the new ping (e.g., new pings 214) at transmit interval 208. In other words, the transmitter may resume pinging at a base value of N (e.g., transmit interval 208). In this way, the new ping may be received by the device which sent live ping 210 (e.g., remote device 126), and other systems and/or devices in the environment may eventually receive the new ping after each one has performed a discovery process similar to discovery process 300.

In some embodiments, at least one of the transmit ping, the live ping, and the new ping includes a plurality of packets, each transmitted at a burst interval (e.g., burst interval 406). The burst interval may correspond to a time each packet in the plurality of packets is spaced apart. In some systems, the burst interval may typically be between 1 and 2 milliseconds. As shown in FIG. 4, burst interval 406 may refer to "t-burst" in some systems, and to "t-packet", in other systems. Burst interval 406 may be measured in a variety of ways, including along a rising edge from one packet to the next (i.e., t-burst). In other embodiments, all pings are transmitted at burst interval 406. Some systems may include a transmit time (i.e., t-packet) and at least one transmitted packet may be received in the transmit time. In one embodiment, the transmit time is less than one burst interval. It should be noted that different applications may have different maximum size packets. As such, t-burst may be set according to the maximum size packet that may be sent. Also, in some applications, each packet in the burst may be the same size, however in other applications, packets within a burst may be sized differently.

In another implementation, transmitter 202 may delay, after live ping 210 is received, transmission of a new ping (e.g., new pings 214) for an additional backoff duration (e.g., backoff duration 216). Backoff duration 216 may be a random duration. If the number of devices in the environment is large enough that the channel on which the devices are communicating cannot be shared at the desired ping rate without collisions, applying the delay duration may effectively reduce the ping rate (i.e., increase N) by spacing out the transmissions. However, in this situation, transmitting devices may constantly be in contention. Random backoff duration 216 may help ensure that contending devices still discover other devices equally. In other words, delay duration and backoff duration 216 may be configured to prevent pings from colliding for up to N/(B*M) devices, where N is a transmit interval (e.g., transmit interval 208), B is the burst interval, and M is the number of packets in the ping (e.g., live ping 210).

In another embodiment, and for example, both monitoring system 10 (which may also be a monitoring device) and remote device 126, the radio (e.g., RF module which may include a transmitter and/or receiver) may be configured to operate within the 2.4 GHz industrial, scientific, and medical (ISM) band. Further, the radio may use 2FSK (frequency-shift keying) with no Manchester encoding, a frequency deviation of 140 kHz, and a data rate of 250 kbps. The tag (e.g., monitoring system 10) may be capable of a max output power of 1 dBm, while the base station (e.g., base station 124) may be capable of up to 0 dBm. A four byte preamble, four byte sync word, and 16 bit CRC (cyclic redundancy check) may be included in each packet.

Channel sharing may be limited to time division schemes based on the assessment and backoff described above. Based on typical usage, transmitter duty cycle for a single device (e.g., monitoring system 10) may be less than 6% in ping mode. While in file transfer mode, the transmitter uses as much of the channel as possible, with carrier sense before each transmission to avoid collisions.

Further, in ping mode, there may be no opportunity for frequency diversity because it may be desired that devices discover each other quickly and with minimal power. Therefore, all devices may ping on one default channel. However, in file transfer mode, both devices may have an opportunity to synchronize with one another for the duration of the file transfer. At this point, some frequency agility may be possible to avoid channels with heavy traffic and increase the reliability of the protocol. When it is time to initiate a file transfer, the base station may send out notification of its preferred file transfer channel in the file transfer request ping. Then, it may begin operating in file transfer mode on this new channel. The tag addressed by the file transfer request may also switch to the new channel and enter file transfer mode. On failure or completion of the file transfer, both devices may revert to ping mode on the default channel. Failure also may result in the base station moving the preferred file transfer channel to the next in a rotating list.

Activity State Classification

Ping mode may allow each device (e.g., monitoring device 10 and/or remote device 126) in an environment to maintain up-to-date knowledge about the presence of other devices. The environment may be an area in which there are multiple devices (e.g. monitoring device 10 and/or remote device 126) that are discoverable to one another. The environment may also be referred to as a network. Further, ping mode may be optimized such that real-time activity classification may be used to dynamically adjust ping periods, such that the average ping period for each discoverable device in the network is maximized, while reliable device discovery is maintained. In other words, shorter ping periods (i.e., faster ping rates) may be necessary when devices are in a state of motion. This may cause frequent changes to the network structure (i.e., ping periods of each device) in the environment For example, if two devices, or tags, (e.g., monitoring device 10 and/or remote device 126) are passing by each other, then at least one of the devices must broadcast its ping during the limited time period when the devices are proximate in order for the devices to discover each other and for the encounter to be registered. On the other hand, if the two tags are stationary, the network structure is unlikely to change and the ping periods may be increased (i.e., the ping rates decreased). In other words, ping rates may be increased with increased movement to enhance discoverability. Maximization of the average ping period of each device in the system may result in saving power as the transmitter may be duty cycled for longer periods of time when devices are moving slowly, or are stationary.

Figure 5:
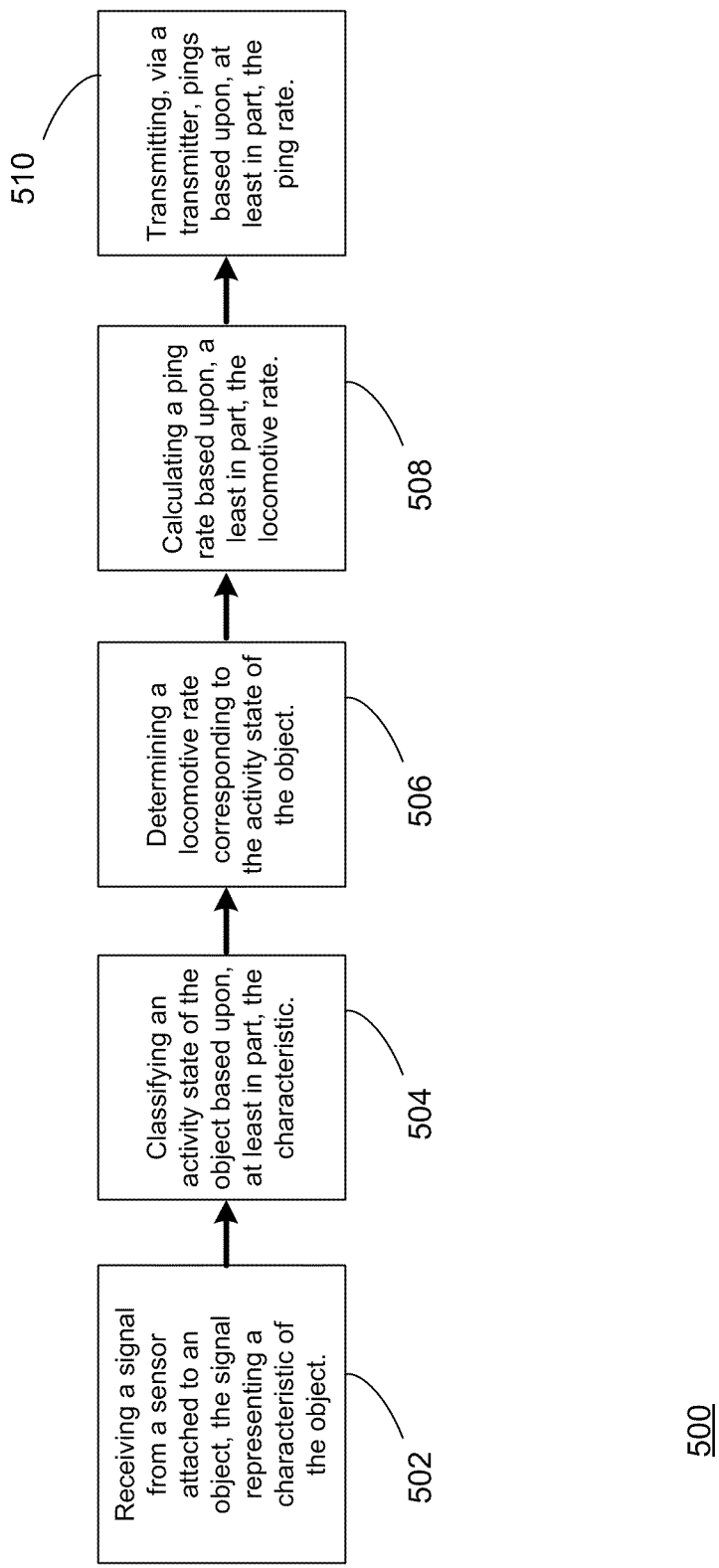
FIG. 5 is a flowchart of an activity state classification process implemented by a monitoring device.
Figure 6:
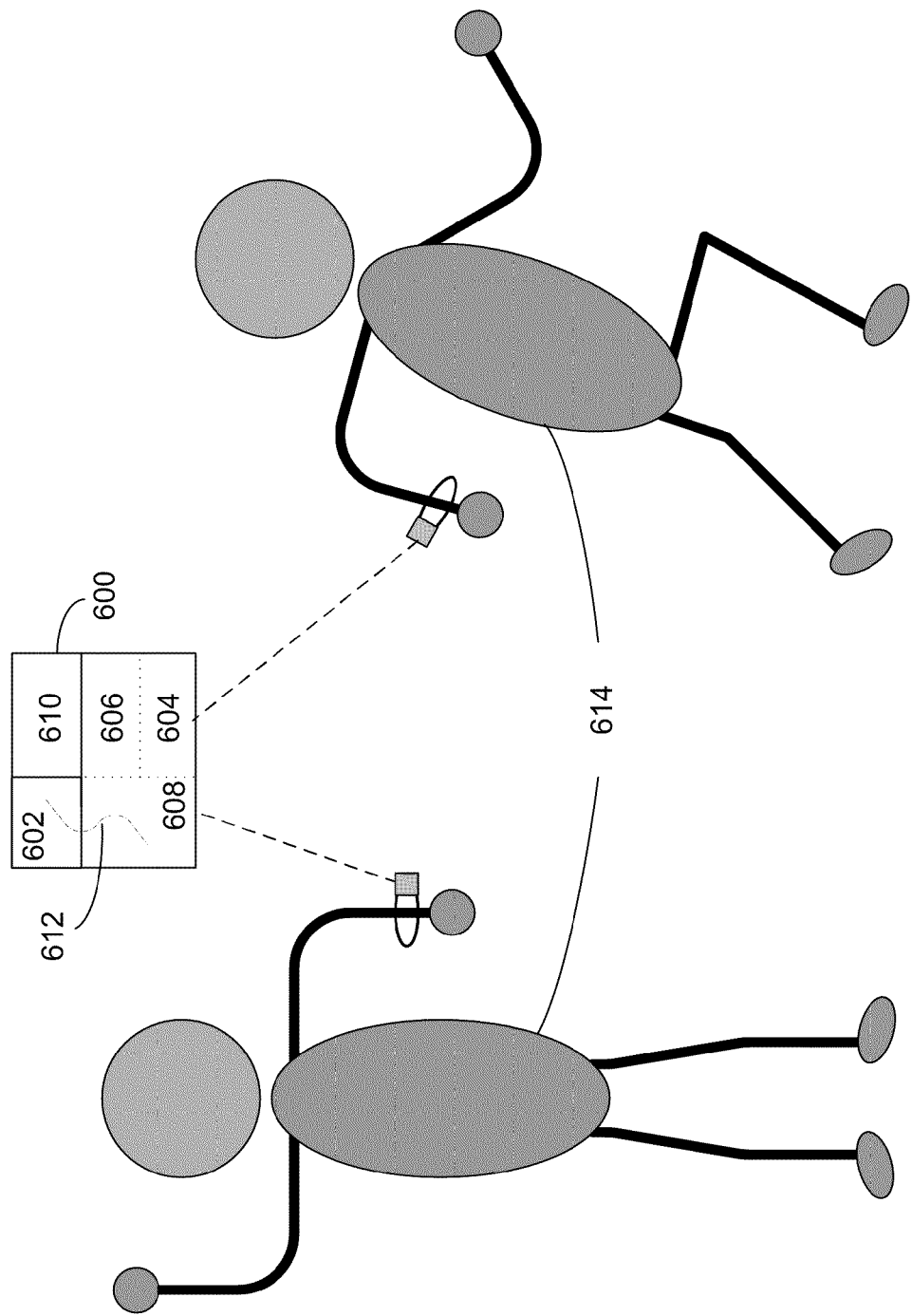
FIG. 6 is a diagrammatic view of the monitoring device worn by a human.

Referring now to FIGS. 5-7 there is shown an activity state classification process 500. Monitoring device 600 may be similar to monitoring system and/or device 10, may include any of the features thereof, and may be a tag worn by a human. Monitoring device 600 may be worn as a bracelet around the wrist, as a necklace around the neck, or may be otherwise attached to a human. For exemplary purposes, monitoring device 600 is shown as being worn by a human (e.g., human 614), however other configurations are possible. Similarly, monitoring device 600 may be worn by a pet animal, such as a dog. Similar to monitoring system 10, monitoring device 600 may include one or more sensors (e.g., sensor 602), a receiver (e.g. receiver 604), a transmitter (e.g., transmitter 606), a controller (e.g., controller 608) and a battery (e.g., battery 610). Controller 608 may be similar to IMC 102 of monitoring system 10. In some embodiments, controller 608 may be any type of microcontroller, microprocessor, or processor configured to perform the operations described herein. Further receiver 604 and transmitter 606 may be included in a single module, such as a transceiver or RF module. Similarly, receiver 604, transmitter 606, and controller 608 may be part of the same module, such as IMC/RF module 102 of monitoring system 10.

Controller 608 may receive 502 signal 612 from sensor 602. Sensor 602 may be attached to an object (e.g., human 614, an animal, a gurney, a hospital bed, a wheelchair, an intravenous pump machine, a cleaning cart, a car, etc.) via monitoring device 600. In some embodiments, sensor 602 may be attached to the object by itself, independent of monitoring device 600. In such systems, sensor 602 may communicate with a controller (e.g., controller 608) wirelessly in order for the controller to receive the signal. Sensor 602 may also simply travel with the object, or may otherwise be configured to sense a characteristic of the object. Signal 612 may represent a characteristic of the object. For example, signal 612 may represent an acceleration, a deceleration, a velocity, an orientation, a feature derived from image processing, a feature derived from RF signal processing, a feature derived from a GPS, a feature derived from a cell tower triangulation, a vibration, a tilt, a feature derived from an acoustic signal, a feature of a dead reckoning system, a switch, a feature of a visible light detector, and a feature of a received infrared signal.

Further, controller 608 may classify 504 activity state 702 of the object (e.g., human 614) based upon, at least in part, the characteristic. Activity state 702 may be indicative of a movement of the object (e.g., human 614). For example, and as shown in FIG. 7, activity state 702 of human 614 may be classified as inactive ($S_I$), low activity ($S_L$), walking ($S_W$), jogging ($S_J$), or running ($S_R$). If the object were a dog, the activity state of the dog may additionally be classified as trotting ($S_T$) or galloping ($S_G$). Other states may include sprinting, biking, rolling, driving, sliding or being carried. Activity states may have different classifications for a number of different objects such as different animals, hospital equipment, cars, planes, etc., based upon the types of movement these objects may undertake. Activity states may be defined by observing movements of each object and classifying them. When classifying activity state 702, based upon the characteristic, controller 608 may do so by using values of the characteristic, which may be derived from signal 612.

Additionally, controller 608 may determine 506 locomotive rate 704. Locomotive rate 704 (L) may correspond to activity state 702 of the object (e.g. human 614). Locomotive rate 704 may be used to calculate locomotion (LO), or the total (i.e., integral) amount of motion (i.e., movement) of the object (e.g., human 614) over a period of time (i.e., a sample interval, D). In other words, the total movement of an object from time1 (t1) to time2 (t2) (e.g., $D_{t1,t2}$) may be $LO_{t1,t2}$. Locomotion may not depend on the path of the movement of the object. Since locomotion may be the total movement of the object, $LO_{t1,t2}$ may be greater than or equal to $D_{t1,t2}$. Several methods may be used to calculate L from the sensor signal and/or other measurements. For example, accelerometer readings may be integrated to approximate velocity over a period of time (i.e., a sample interval). Another method may take advantage of the activity state classification described above. For example, given an activity state (e.g., activity state 702, S), locomotive rate 704 of that state, $L_S$, may be defined by looking up a value in a table (e.g., FIG. 7) indexed by S. Controller 608 may look up locomotive rate 704, corresponding to activity state 702, or any other values in the table of FIG. 7, and may use those values to make further calculations. A table such as that in FIG. 7 may be stored in flash memory which may be included in monitoring device 600.

As shown in FIG. 7, each activity state 702 may have corresponding locomotive rate 704. Where the activity state is "inactive" ($S_i$), the locomotive rate ($L_i$) may be approximated at 0.0001 m/s. It should be noted that all values in FIG. 7 are shown for exemplary purposes only. Values for locomotive rate 704 may be calculated through research and empirical methods, measured, averaged, or experimentally found, for any type of object. For example, if a human (e.g., human 614) has an activity state of "walking", the locomotive rate ($L_W$) may have been approximated, or statistically calculated to be on average 1 m/s.

The table in FIG. 7 may include values for other parameters including but not limited to those shown in FIG. 7. One such parameter may be device range 706. In some systems, each device in the environment may have the same device range. In other systems, the device range of each device may be different. Device range 706 may be a maximum distance that a device's (e.g., monitoring device 600) pings may travel while still being receivable at a receiver of another device. In other words, device range 706 may be a maximum distance away from another device, at which the device (e.g., monitoring device 600) is still discoverable to the other device.

Controller 608 may calculate 508 a ping period (e.g., ping period 708) based upon, a least in part, locomotive rate 704. Ping period 708 (N) may be a number of seconds per ping period unit. As shown in FIG. 7, ping period 708 may be defined in terms of unit time over ping period unit (i.e., s/ping period unit). Given activity state 702, locomotive rate 704, and device range 706, controller 608 may calculate ping period 708 (N) using Formula 1 (below).

$$N(s/\text{ping period unit}) = R(m/\text{ping period unit})/L(m/s) \quad \text{Formula 1}$$

In some embodiments, controller 608 may calculate ping rate. Further, in some systems, it may be necessary to bound the formula. To bound the formula, constants, C1, and/or C2 may be used. C1 may be a lower limit, and may ensure that ping period 708 (N) is not shorter than the time it takes to burst the ping itself (e.g., B*M, as discussed above). C2 may be an upper limit, and may ensure that devices (e.g., monitoring device 600) that may leave the network (i.e., environment) for reasons other than movement may be detected. For example if a device (e.g., monitoring device 600) loses power, it may lead to a time between pings that is greater than the maximum period. The values C1 and C2 may be specific to each particular application or each particular object (e.g., human 614, a dog, a car, etc.). When using the two constants C1 and C2, controller 608 may calculate ping period 708 (N) using Formula 2 (below).

$$N(s/\text{ping period unit}) = \min(\max(R(m/\text{ping period unit})/L(m/s), C_1), C_2) \quad \text{Formula 2}$$

In some embodiments controller 608 may calculate ping period 708 (N) using only C1 or only C2. Moreover, controller 608 may duty cycle a transmitter (e.g., transmitter 606) based upon, at least in part, ping period 708. In other words controller 608 may turn transmitter 606 "on" and "off" based on ping period 708. If locomotive rate 704 is relatively low (i.e., the activity state is inactive) and in turn Formula 2 yields a high ping period (N), controller 608 may turn transmitter 606 to an "off" (or otherwise inactive, asleep, or using less power) mode for longer periods of time. Conversely, if locomotive rate 704 is relatively high (i.e., the activity state is jogging or running) and in turn Formula 2 yields a low ping period (N), controller 608 may turn transmitter 606 to an "on" (or otherwise active, awake, or using more power) mode for longer periods of time. In this way, controller 608 may be configured to efficiently use transmitter 606 to be discovered by other devices in the environment while saving power.

Moreover controller 608 may be configured to cause transmitter 606 to transmit 512 pings based upon, at least in part, ping period 708. For example, if locomotive rate 704 is increased (i.e., the object is moving faster), controller 608 may decrease the amount of time between each ping (i.e., decrease the ping period) transmitted. In other words, controller 608 may increase the ping rate of transmitter 606. If locomotive rate 704 is decreased (i.e., the object is moving slower), controller 608 may increase the amount of time between each ping (i.e., increase the ping period). In other words, controller 608 may decrease the ping rate of transmitter 606. In one embodiment, at least one packet of at least one of the pings transmitted by transmitter 606 may include information representing the activity state (e.g., activity state 702) of the object (e.g., human 614).

In this way, controller 608 may be configured to use transmitter power efficiently, while still allowing other devices in the environment to discover it. As such, controller 608 may maximize discoverability by increasing ping rates during high periods of locomotion while minimizing power consumption through reducing transmissions of pings during low states of locomotion.

In another embodiment, controller 608 may decrease the ping period of pings transmitted by transmitter 606 based upon, at least in part, a change in the activity state of the object. Further, controller 608 may increase the ping period of pings transmitted by transmitter 606 based upon, at least in part, a change in the activity state of the object. In this situation, controller 608 may control the ping period of pings transmitted by transmitter 606 without use of the locomotive rate.

In one implementation, controller 608 may dynamically adjust the ping period of the transmitter based upon, at least in part, a real-time activity state classification of the object. The real-time activity state classification may be based upon, at least in part, the characteristic. As discussed above controller 608 may classify 504 activity state 702 of the object (e.g., human 614) based upon, at least in part, the characteristic. If controller 608 continuously runs an activity state classifier (i.e., continuously classifies the activity state of the object), it may continuously use locomotive rate 704 to calculate the ping period. In this way, controller 608 may dynamically adjust the ping period or ping rate of transmitter 606.

Various operations and features have been described above, however some embodiments may not require each operation and/or feature. For example, controller 608 may duty cycle transmitter 606 based upon, at least in part, the characteristic which is represented by signal 612, without using locomotive rate 704. Controller 608 may also use signal 612 to directly control the duty cycling of transmitter 606. In other embodiments, ping period 708 may be calculated based upon, at least in part, the characteristic. Controller 608 may calculate ping period 708 without using locomotive rate 704.

In one implementation controller 608 may regulate power drawn from a battery (e.g., battery 610) based upon, at least in part, the characteristic, or signal 612. For example, controller 608 may regulate the power that transmitter 606 draws from battery 610 by duty cycling transmitter 606 and/or controlling the transmission of pings transmitted by transmitter 606 based upon the characteristic, or signal 612. Further a voltage regulator, which may be part of power management circuitry 116 may be used to regulate power drawn from the battery based upon the characteristic, or signal 612. Additionally, controller 608 may be configured to regulate power drawn from the battery 610 based upon, at least in part, activity state 702.

Some of the embodiments described above may be implemented as software modules executed by a processor of a computing system, and/or in a computer program product that may be stored on a storage device, storage medium, or computer readable medium having instructions that when executed by a processor perform portions of the discovery process above. The storage device, storage medium, or computer readable medium may include, but is not limited to, any type of disk including floppy disks, optical disks, compact disk read only memories (CD-ROMS), compact disk rewritables (CD-RWs), magneto-optical disks, semiconductor devices such as read-only memories (ROMs), random access memories (RAMs) such as dynamic and static RAMs, electronically erasable programmable read-only memories (EEPROMs), flash memories, magnetic or optical cards, or any type of media suitable for storing electronic instructions. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A method comprising:
transmitting, via a transmitter, a plurality of transmit pings at a transmit interval, the transmit interval corresponding to a time between transmission of each transmit ping;
listening, via a receiver, for a live ping, the receiver configured to be turned on at a beginning of an assess interval, and off at an end of a detect duration, the assess interval corresponding to a time each packet in the live ping is spaced apart multiplied by an amount of packets in the live ping, the detect duration corresponding to the time each packet in the live ping is spaced apart plus a transmit time, the transmit time corresponding to a time required for a packet to travel from one device to another;
receiving, via the receiver, at least one packet from the live ping;
delaying, after receiving the live ping, transmission of a new ping for a delay duration, the delay duration corresponding to an amount of time determined, at least in part, by a counter value of a packet of the live ping, the delay duration determined using the counter value of the packet of the live ping, wherein the counter value is included in the packet of the live ping and corresponds to a position of the packet within the live ping; and
transmitting, via the transmitter, new pings at the transmit interval.

2. The method of claim 1 wherein at least one of the transmit ping, the live ping, and the new ping comprises a plurality of packets, each transmitted at a burst interval, the burst interval corresponding to a time each packet in the plurality of packets is spaced apart, wherein each packet comprises at least one of a device identifier, status information, and a counter value.

3. The method of claim 2 wherein at least one packet of the plurality of packets is received in the transmit time.

4. The method of claim 3 wherein the transmit time is less than one burst interval.

5. The method of claim 4 wherein the detect duration corresponds to the transmit time plus one burst interval.

6. The method of claim 2 wherein the burst interval is between about 1 millisecond and about 2 milliseconds.

7. The method of claim 2 wherein at least one of the transmit ping, the live ping, and the new ping comprises between about 96 packets and about 320 packets.

8. The method of claim 2 wherein the packets are RF packets.

9. The method of claim 1 wherein the transmit interval is between about 3 seconds and about 12 seconds.

10. The method of claim 1 further comprising
delaying, after receiving the live ping, transmission of a new ping for an additional backoff duration, the backoff duration corresponding to an amount of time configured to prevent pings from colliding.

11. A method comprising:
transmitting, via a transmitter, a plurality of transmit pings at a transmit interval, the transmit interval corresponding to a time between transmission of each transmit ping, each transmit ping including a number of packets;
listening, via a receiver, for a live ping, each live ping including a number of packets, the receiver configured to be turned on at a beginning of an assess interval, and off at an end of a detect duration, the assess interval corresponding to a time each packet in the live ping is spaced apart multiplied by an amount of packets in the live ping, the detect duration corresponding to the time each packet in the live ping is spaced apart plus a transmit time, the transmit time corresponding a time required for a packet to travel from one device to another;
receiving, via the receiver, at least one packet of the live ping;
delaying, after receiving the live ping, transmission of a new ping for a delay duration plus a backoff duration, the delay duration corresponding to an amount of time determined, at least in part, by a counter value of the received packet of the live ping, the delay duration determined using the counter value of the packet of the live ping, wherein the counter value is included in the packet of the live ping and corresponds to a position of the packet within the live ping, the counter value designating which packet in the live ping was received by the receiver, the backoff duration corresponding to an amount of time configured to prevent pings from colliding; and
transmitting, via the transmitter, the new ping at the transmit interval, the new ping including a plurality of packets.

12. The method of claim 11 wherein the assess interval is B*M, wherein B corresponds to the time each packet in the live ping is spaced apart, and M corresponds to the amount of packets in the live ping.

13. The method of claim 11 wherein the detect duration is B+P, wherein B corresponds to the time each packet in the live ping is spaced apart, and wherein P corresponds to the amount of time each packet of the live ping is in transmission.

14. The method of claim 11 wherein the backoff duration is configured to prevent pings from colliding for up to N/(B*M) devices, wherein N corresponds to the transmit interval, the transmit interval corresponding to a time between transmission of each ping, wherein B corresponds to the time each packet in the live ping is spaced apart, and wherein M corresponds to the amount of packets in the live ping.

15. The method of claim 11 further comprising duty cycling the receiver based upon, at least in part, the assess interval.

16. The method of claim 11 further comprising duty cycling the receiver based upon, at least in part, the detect duration.

17. A method comprising:
transmitting, via a transmitter, a plurality of transmit pings at a transmit interval, the transmit interval corresponding to a time between transmission of each transmit ping, each transmit ping including a number of packets;
listening, via a receiver, for a live ping;
receiving, via the receiver, at least one packet of the live ping;
delaying, after receiving the live ping, transmission of a new ping for a delay duration, the delay duration corresponding to an amount of time determined, at least in part, by a counter value of a packet of the live ping, the delay duration determined using the counter value of the packet of the live ping, wherein the counter value is included in the packet of the live ping and corresponds to a position of the packet within the live ping; and transmitting, via the transmitter, the new ping at the transmit interval, the new ping including a plurality of packets.

18. A method of claim 17 wherein a monitoring device having the transmitter is in communication with a remote device having a second receiver, without network synchronization.

19. The method of claim 18 further comprising duty cycling the receiver.

20. A device comprising:
- a transmitter configured to transmit a plurality of transmit pings at a transmit interval, the transmit interval corresponding to a time between transmission of each transmit ping, each transmit ping including a number of packets;
- a receiver configured to listen for a live ping and to receive at least one packet of the live ping; and
- the transmitter further configured to:
  - delay transmission of a new ping for a delay duration, the delay duration corresponding to an amount of time determined, at least in part, by a counter value of the at least one packet of the live ping, the delay duration determined using the counter value of the at least one packet of the live ping, wherein the counter value is included in the at least one packet of the live ping and corresponds to a position of the at least one packet within the live ping; and
  - transmit a new ping at the transmit interval.

\* \* \* \* \*